United States Patent
Gierer et al.

(10) Patent No.: US 6,948,395 B2
(45) Date of Patent: Sep. 27, 2005

(54) LIMP HOME DEVICE FOR A VEHICLE WITH AUTOMATIC TRANSMISSION

(75) Inventors: Georg Gierer, Kressbronn (DE); Christian Popp, Kressbronn (DE); Klaus Steinhauser, Kressbronn (DE); Peter Schiele, Kressbronn (DE)

(73) Assignee: ZF Friedrichshafen AG (DE)

( * ) Notice: Subject to any disclaimer, the term of this patent is extended or adjusted under 35 U.S.C. 154(b) by 126 days.

(21) Appl. No.: 10/437,517

(22) Filed: May 14, 2003

(65) Prior Publication Data

US 2004/0010361 A1 Jan. 15, 2004

(30) Foreign Application Priority Data

Jul. 15, 2002 (DE) ......................................... 102 31 819

(51) Int. Cl.$^7$ ............................................... F16H 59/00
(52) U.S. Cl. ............................ 74/335; 477/906; 701/62
(58) Field of Search .......................... 477/906; 701/62; 74/335

(56) References Cited

U.S. PATENT DOCUMENTS

| 5,070,832 A | * | 12/1991 | Hapka et al. ............ 123/198 D |
| 5,090,269 A | * | 2/1992 | Ohtsuka et al. ................ 74/335 |
| 5,315,972 A | * | 5/1994 | Judy et al. .............. 123/198 D |

FOREIGN PATENT DOCUMENTS

| DE | 19810479 A1 | 9/1999 |
| DE | 199 19537 A1 | 11/2000 |
| EP | 0 380 214 A2 | 8/1990 |
| EP | 0 431 538 B1 | 6/1991 |

* cited by examiner

*Primary Examiner*—Dirk Wright
(74) *Attorney, Agent, or Firm*—Milde & Hoffberg LLP

(57) ABSTRACT

A device to allow for emergency operation of an automatic-transmission motor vehicle, having a monitoring device to monitor pre-determined operating parameters, a diagnostic device to detect faults, a control device to activate an alternative function, and an output device by means of which the fault may be presented to the driver. The control device provides the driver an emergency operation capability while providing an alternative function depending on the degree of the fault.

18 Claims, 1 Drawing Sheet

LIMP HOME DEVICE FOR A VEHICLE WITH AUTOMATIC TRANSMISSION

FIELD OF THE INVENTION

The invention relates to a device allowing emergency operation of an automatic-transmission motor vehicle.

BACKGROUND OF THE INVENTION

Automatic transmissions, which include automated shift, multi-ratio automatic transmissions that may be shifted under power-train load or with interruption of load, or variable-ratio transmissions, are operated by driver input via a selector lever and/or a programmed shifter, and an electronic control unit that communicates with other electronic power-train control units, or with other vehicle components such as, for example, a drive motor or a braking system, and selects and activates a suitable drive ratio.

In order to recognize failure of electronic and/or mechanical components and to react to them accordingly, motor vehicles with automatic transmissions are usually equipped with a device allowing emergency operation, that monitors pre-determined operating parameters and, upon recognition of a failure, i.e., a deviation of an observation unit or component or a software function, activates an alternative function, which makes it is possible to continue operation of the motor vehicle, with limited operating function, so that the vehicle may be driven under emergency conditions to a repair facility.

Such a device allowing emergency operation is known from EP 0 431 538 B1, for example, whereby a pre-determined drive ratio may be selected using a specialized magnetic valve.

Using a device allowing emergency operation known from EP 0 380 214 A2, the driver is able to select a forward or reverse drive ratio from those normally available when the conventional electronic control unit or the distribution cable fails, provided that the shift actuator is still functional.

Further, a device allowing emergency operation is known from DE 199 19 537 A1, in which the control unit assigned to the transmission is connected with an additional electronic actuation unit, so that, upon a failure, manual control of the transmission is possible via the actuation unit, whereby all available gear ratios may be selected and the vehicle may be driven even for long distances to a repair facility.

The constantly-increasing complexity of automatic transmissions presents ever greater challenges to the diagnosis or monitoring system. Also, safety requirements with so-called shift-by-wire systems are increasing greatly.

With known devices allowing emergency operation, this often leads to a conflict in goals, since, on the one hand, the driver should have the vehicle available as long as possible upon recognition of a fault, and on the other, critical safety situations may arise during extended operation under conditions of alternative functionality that are hard to manage because of system complexity, or that cannot be checked during long-term operation because of the large number of possibilities.

Even eventual indication on a display within the vehicle interior, intended to notify the driver that the system is defective, and that he should drive to a repair facility as soon as possible, cannot prevent the driver from continuing to drive the vehicle under conditions of alternative functionality, for example due to cost constraints.

SUMMARY OF THE INVENTION

It is therefore an object of the present invention to provide a device allowing emergency operation of a motor vehicle with an automatic transmission, by means of which alternative functionality is provided, and with which the driver may drive to a repair facility, but long-term operation with alternative functionality is effectively prevented.

This object is fulfilled, for example, by a device allowing emergency operation of a motor vehicle with automatic transmission, with a monitoring device to monitor predetermined operating parameters, a diagnostic device to detect faults, a control device to activate an alternative function, and an output device by means of which faults may be presented to the driver, characterized in that the control device allows an emergency operating period by means of the alternative function depending on the degree of the fault, which is presented to the driver.

The device allowing emergency operation based on the present invention, provides a control unit to activate alternative functionality allowing emergency operation depending on the degree of severity of the defect reported to the driver, and offers the advantage that there is no large-scale limitation to vehicle operation that might not be noticed by the driver, thus leading to a longer-term critical safety situation. When a failure in the device allowing emergency operation is detected by the monitoring or diagnostic device, this failure invokes an alternative function that determines the capability of the vehicle for emergency operation, by means of pre-determined limiting values of operating parameters. This capability for emergency operation is clearly indicated to the driver, whereby driver notification of this information may be by touch and/or optically and/or acoustically.

The device allowing emergency operation based on the present invention represents a so-called "fail-safe" system, i.e., if a fault is detected within a pre-determined scope, such as the transmission only, or possibly other drive-train components and pertinent software functionality, the system initiates measures via the control device appropriate to the fault, and activates devices operating in conjunction with the system. Thus, the highest priority is for passenger safety, followed by capability of emergency operation and protection of the transmission.

A fault detected by a suitable diagnostic device is subsequently assigned to a type of priority list based on its importance, i.e., its effect on safety, whereby a serious fault, or a fault having varying degrees of severity occurring at a high degree, immediately leads to immobilization of the vehicle. A fault of less significance may be so handled that the vehicle may be driven to a certain extent.

The remaining capability of emergency operation, such as remaining expected operation time, performance, or comfort, is reported to the driver, for example, it may be sent by an output device to a display on which, depending on the degree of limitation to functional capability, the maximum remaining operation time or mileage or permissible number of startup procedures until vehicle immobilization, is shown.

Since the driver receives information that vehicle operation is permissible only for a specified time or at a specified performance level, he is forced to seek out a repair facility to remove the fault before his vehicle becomes immobilized.

In an advantageous embodiment of the invention, specification of the decree of emergency operability by the control device is made by selection of the available gears or transmission drive ratios. With a serious fault, this may mean that operation is possible only in first gear, or only in first and second gear. For faults in the system of a particular shifting element (electric drive, hydraulic drive, servo device, oil supply, etc.), only those gears may be selected in which the faulty shifting element need not be shifted.

An effective means of notifying the driver clearly of reduced capability for emergency operation, is to indicate to him by means of a gradual reduction in the selection of available gears and/or remaining time or distance, the performance level, and/or non-performance of driving capability available.

Vehicle functions whose non-performance clearly notifies the driver of reduced capability for emergency operation include, for example, a SBC (standby control) function, blockage of a performance-driving program, or clear reduction in agility and spontaneity in that characteristic curves for non-performance-driving are selected, and the transmission up-shifts at lower engine speeds.

A "gradual dying" of a vehicles capability to the point of vehicle immobilization may be applied to other vehicle systems and components such as engine-control electronics, braking system, suspension system, an anti-slip system, a steering system, etc., that communicates with the transmission via a CAN bus. The CAN bus may also be linked to a telematics system, to communicate with a remote system, for example, a service host. This may allow, for example, the vehicle to communicate the problem to a remote system, and negotiate a suitable repair procedure.

Additional advantages and advantageous embodiments of the invention will be apparent from a review of the Detailed Description of the Preferred Embodiments, and the Figures.

BRIEF DESCRIPTION OF THE DRAWINGS

An embodiment example of a device allowing emergency operation according to the present invention is shown in simplified view schematically, and is described in further detail in the subsequent Description.

DETAILED DESCRIPTION OF THE PREFERRED EMBODIMENTS

Figure 1:
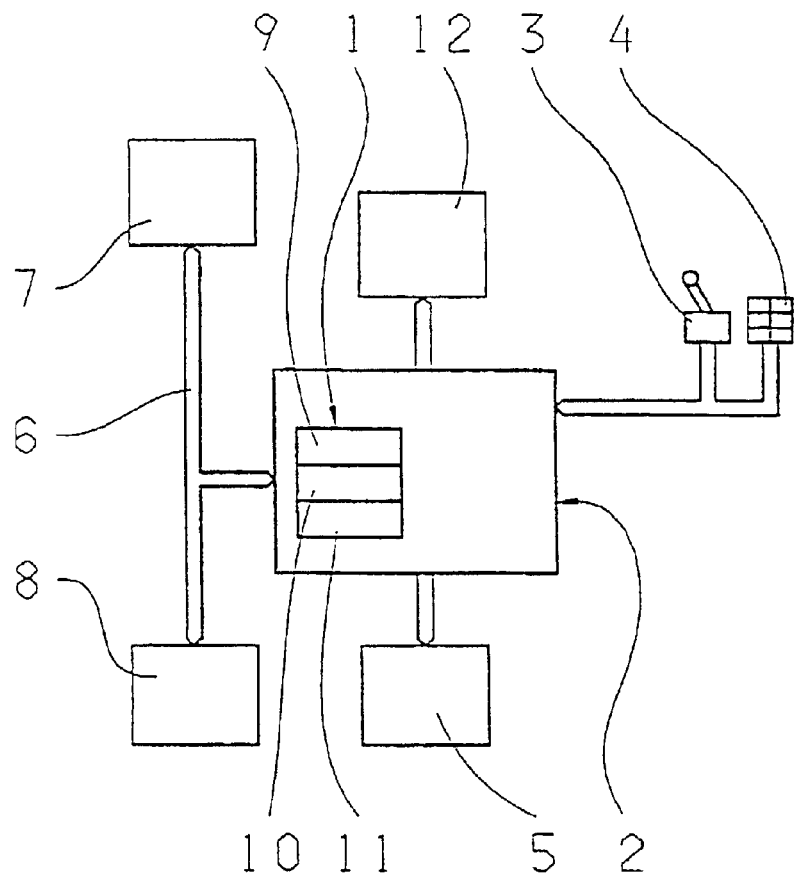
FIG. 1 shows the schematic design of a device allowing emergency operation based on the invention.

FIG. 1 includes a greatly-simplified schematic with a device allowing emergency operation 1 that is here integrated into a control unit 2 of a motor vehicle automatic transmission. The control unit 2 is connected using suitable signal lines with a selector lever 3 operable by the driver, and with a selection device including a programming button 4, in dependence on whose signals the control unit 2 selects the gear or gear ratio suitable to the situation during normal vehicle operation by means of the setting device 5 (shown only schematically).

In the illustrated example, the control unit 2 is connected with other vehicle control units via a CAN bus 6, of which, for example, a motor control unit 7 and a braking system control unit 8 are shown. The control units 2, 7, and 8 exchange data to control their subordinate systems, and possess conventional inputs for regulation and control parameters as well as outputs to actuators or the like.

In order to monitor pre-determined operating transmission parameters or data from other control units via the CAN bus 6, the control unit 2 of the automatic transmission includes a monitoring device 9 that interacts with a diagnostic device 10 to detect faults.

When the diagnostic device 10 detects a fault, an alternative function is activated via a control device 11 integrated into the control unit 2 of the automatic transmission, that issues a signal assigned to the particular emergency operation situation in order to implement vehicle emergency operation capability. It should be understood that the control units may be programmable electronic devices, in which functions are implemented by computer software, and/or may include special purpose hardware components.

The vehicle emergency operation capability permitted by the control device 11 is then reported to the driver via optical and acoustic signals from an output device 12. Alternatively, the driver may be notified either alternatively or additionally by means of a tactile signal. The audio, visual or tactile indicators may be generic resources available within the vehicle, for example an entertainment sound system, graphic user display, or force-feedback element in the steering wheel or gear selector, or may be specially provided for this purpose.

The particular capability for emergency operation depends on the severity of the detected fault and the degree of the fault.

Figure 2:
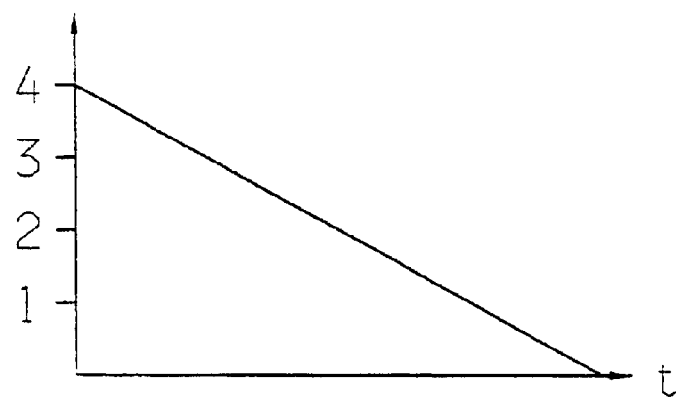
FIG. 2 shows a diagram showing reliable capability for emergency operation dependent on the degree of the fault.

As shown in FIG. 2, the reliable capability for emergency operation increases as the degree of fault decreases, whereby the remaining available operating time t is represented qualitatively.

In the event of a fault hazardous to passengers, assigned a fault degree of "4" here, an emergency operation capability of "0," i.e., immediate vehicle immobilization, is prescribed by the control device 11. Of course, if the fault occurs while the vehicle is in motion, or other safety critical situation, temporary mode for controlled stopping may be provided. In cases where a fault is not safety-critical, or where it merely reduces the service life of the transmission or of other vehicle components, or when a fault causes a violation of laws such as exhaust or noise emission values or fuel-consumption values, a relatively long emergency-operation period is allowed, so that the driver can drive to a repair facility without difficulty.

Assignment of a particular fault degree to a fault by means of the diagnostic device 10 is based, among other things, on the anticipated extent of damage, i.e., whether there are no anticipated injuries, the potential for injuries that are light, serious, or irreversible, up to those involving death to one or more persons. Assignment is also based on the probability of the undesirable event occurring and on the driver's ability to avoid the hazard.

In order to clearly inform the driver in the embodiment example described here, acoustic and optical signals are issued informing the driver of the remaining operating time t, which is measured by a time counter, that starts with the detection of the fault, and even if the acoustic and optical signals from the output unit 12 fail to be issued, provides a gradual reduction of useable torque so that, on the first day after occurrence of such a fault, a selection of three forward gears is available, and on the second day, a selection of only two forward gears is available, and on the third day, only one forward gear is available.

Of course, the diminution may be based on time that the vehicle is used, distance traveled (or revolutions of the engine, or other suitable usage-sensitive parameter), an adaptive update of actual conditions, to the extent that these may be ascertained, or the like.

This scheme may also be implemented as a part of normal vehicle operation. That is, a performance level exceeding normal vehicle specifications may be made available on a limited basis. This may be a predetermined limit, or adaptive based on conditions within the system.

While the above detailed description has shown, described and pointed out the fundamental novel features of the invention as applied to various embodiments, it will be understood that various omissions and substitutions and changes in the form and details of the system and method illustrated may be made by those skilled in the art, without departing, from the spirit of the invention. Consequently, the full scope of the invention should be ascertained by the appended claims.

What is claimed is:

1. A device allowing emergency operation of a motor vehicle, having an automatic transmission, comprising a monitoring device to monitor pre-determined operating parameters, a diagnostic device to detect a fault, a control device to activate an alternative function, and an output device for presenting an indication of a fault to a driver, wherein the control device allows an emergency operating period by means of the alternative function depending on a degree of the fault, such emergency operating period being presented to the driver.

2. A device as in claim 1, wherein a degree of fault is determined by a violation of legal environmental-protection regulations, comprising non-compliance with prescribed exhaust gas emissions values, fuel-consumption values, or noise emissions.

3. A device as in claim 1, wherein the output device presents the emergency-operation capability to the driver via at least one of optical, acoustic, and tactile signals.

4. A device as in claim 1, wherein the control device allows emergency operation by means of a limitation on selection of available gears.

5. A device as in claim 1, wherein the control device allows limited emergency operation selected from the group consisting of a limited time, a limited distance, and a limited number of startup procedures, after the fault is recognized.

6. A device as in claim 1, wherein the alternative function comprises a reduced capability for emergency operation, which is reported to the driver by means of a gradual reduction in one or more of a selection of available gears, a remaining time, a distance, an available performance, and a non-performance of driving functions.

7. A method for allowing emergency operation of a motor vehicle having an automatic transmission, comprising a monitoring pre-determined operating parameters, detecting a fault, activating an alternative function, presenting an indication of a fault to a driver, and providing a limited emergency operating period by means of the alternative function depending on a degree of the fault, such emergency operating period being presented to the driver.

8. A method as in claim 7, further comprising the step of wherein determined a degree of fault based on a violation of legal environmental-protection regulations, comprising at least one of non-compliance with prescribed exhaust gas emissions values, fuel-consumption values, or noise emissions.

9. A method as in claim 7, further comprising the step of presenting the emergency-operation capability to the driver via at least one of optical, acoustic, and tactile signals.

10. A method as in claim 7, further comprising the step of limiting selection of available gears during emergency operation.

11. A method as in claim 7, further comprising the step of limiting emergency operation by limiting at least one of an operating time, an operating distance, and a number of startup procedures, after the fault is recognized.

12. A method as in claim 7, wherein the alternative function comprises a reduced capability for emergency operation, which is reported to the driver by means of a gradual reduction in one or more of a selection of available gears, a remaining time, a distance, an available performance, and a non-performance of driving functions.

13. An automobile, having a normal operating mode and an alternative function, comprising a control which monitors pre-determined operating parameters, detects a fault, and activates the alternative function in dependence thereon, and wherein a driver is presented with an indication of, and level of restriction associated with, the alternative function through an output device, said control providing a limited emergency operating period by means of the alternative function depending on a degree of the fault.

14. An automobile as in claim 13, wherein the degree of fault is determined based on a violation of legal environmental-protection regulations, comprising at least one of non-compliance with prescribed exhaust gas emissions values, fuel-consumption values, or noise omissions.

15. An automobile as in claim 13, wherein the output device presents the emergency-operation capability to the driver via at least one of optical, acoustic, and tactile signals.

16. An automobile as in claim 13, wherein the control limits selection of available gears during emergency operation.

17. An automobile as in claim 13, wherein the control, during emergency operation, limits at least one of an operating time, an operating distance, and a number of startup procedures, after the fault is recognized.

18. An automobile as in claim 13, wherein the alternative function comprises a reduced capability for emergency operation, which is reported to the driver by means of a gradual reduction in one or more of a selection of available gears, a remaining time, a distance, an available performance, and a non-performance of driving functions.

* * * * *